United States Patent [19]

Burger et al.

[11] Patent Number: 4,588,306

[45] Date of Patent: May 13, 1986

[54] ELECTRONIC THERMOMETER PROBE ASSEMBLY

[75] Inventors: Laurie J. Burger, Attleboro Falls, Mass.; Donald E. Protzmann, Litchfield; Robert F. Uhl, Cheshire, both of Conn.

[73] Assignee: Chesebrough-Pond's Inc., Greenwich, Conn.

[21] Appl. No.: 715,019

[22] Filed: Mar. 22, 1985

[51] Int. Cl.4 ............................................... G01K 1/08
[52] U.S. Cl. .................................. 374/158; 374/209; 206/306
[58] Field of Search ................. 374/158, 209; 206/306

[56] References Cited

U.S. PATENT DOCUMENTS

| | | | |
|---|---|---|---|
| 3,738,172 | 6/1973 | Sato | 374/158 |
| 3,822,593 | 7/1974 | Oudewaal | 206/306 |
| 3,832,669 | 8/1974 | Mueller et al. | 206/306 |
| 3,833,115 | 9/1974 | Schapker | 374/158 |
| 3,905,232 | 9/1975 | Knute | 374/158 |
| 3,929,018 | 12/1975 | Turner | 374/158 |
| 3,999,434 | 12/1976 | Yen | 374/158 |
| 4,054,057 | 10/1977 | Kluge | 374/158 |

Primary Examiner—Charles Frankfort
Assistant Examiner—Thomas B. Will
Attorney, Agent, or Firm—Brumbaugh, Graves, Donohue & Raymond

[57] ABSTRACT

An electronic thermometer probe and cover assembly includes a probe extending from a handle and having limited axial movement into the handle against a resilient force. An elongated cover having open and closed ends fits over the probe. Cooperating elements on the open end of the cover and the handle snap together when the probe is moved into the handle by the cover to retain the cover in position with intimate contact between the probe end and cover. Actuation of a thumb button on the handle increases the force urging the probe out of the handle to unsnap the cover from the probe handle.

2 Claims, 8 Drawing Figures

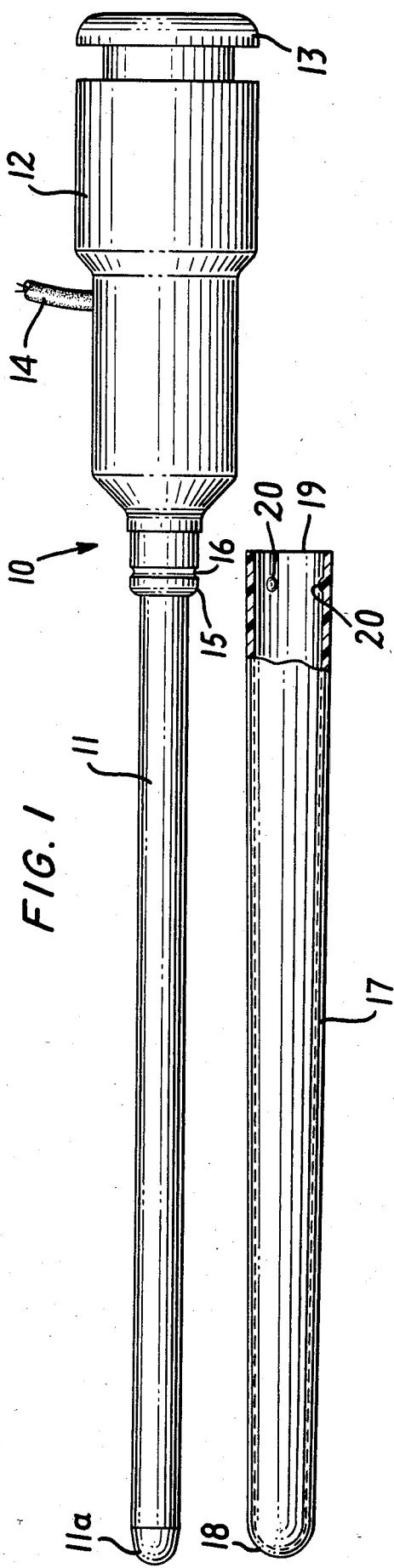
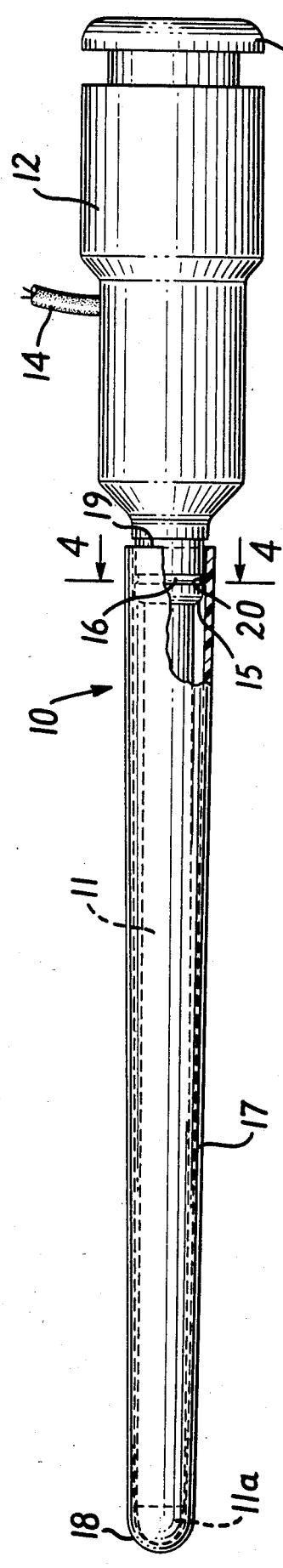
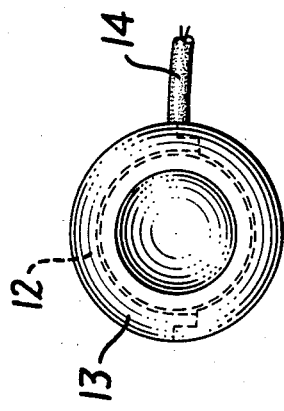
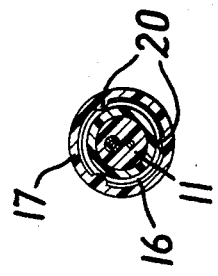

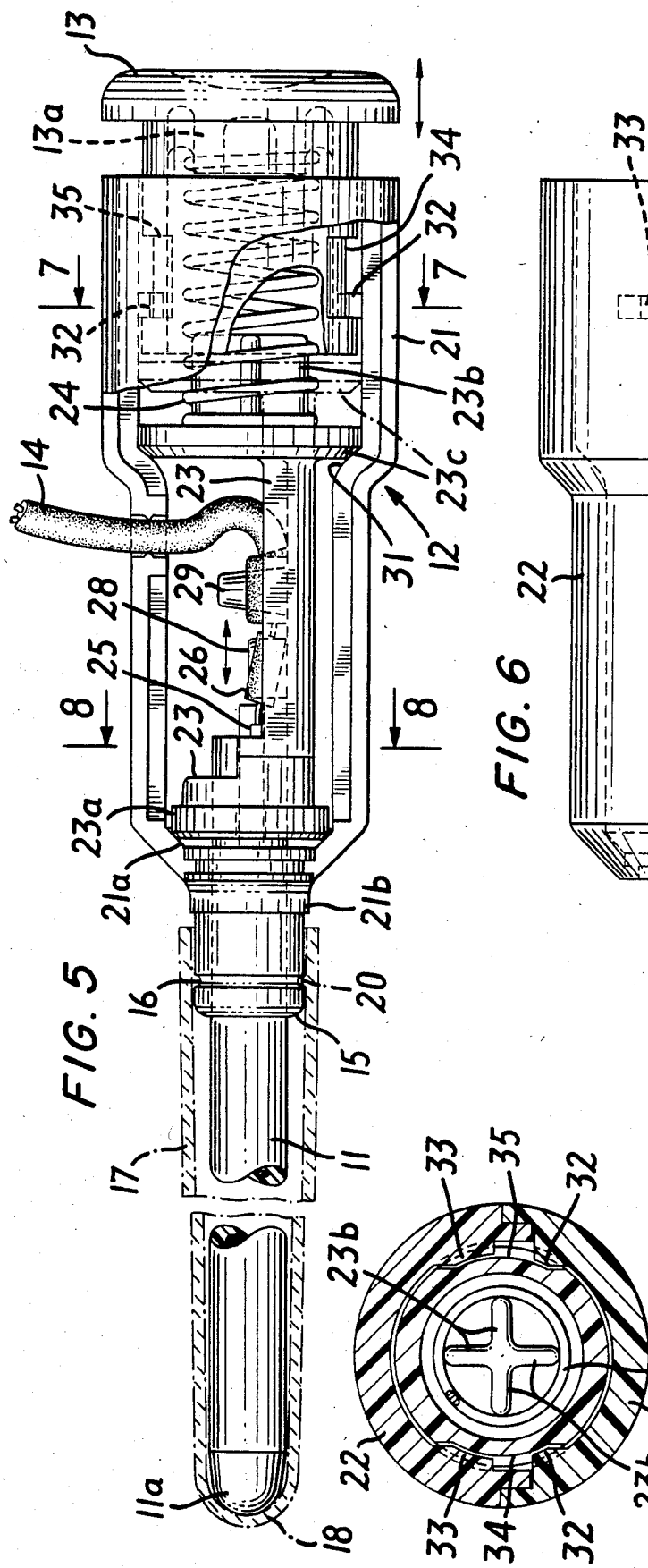

ELECTRONIC THERMOMETER PROBE ASSEMBLY

BACKGROUND OF THE INVENTION

In recent years electronic thermometers, which provide rapid and accurate readings of body temperature, have supplanted mercury thermometers in hospitals and the like. Such electronic thermometers ordinarily use a probe at the end of which is located a temperature sensitive element, for example a thermister. A sterile disposable cover is placed on the probe prior to use. After a patient's temperature is taken by insertion of the probe into a body orifice, the probe cover is removed and discarded.

Problems incident to use of probe covers include their placement over the probe, retention on the probe, poor contact with the tip of the probe which inhibits efficient heat transfer to the temperature sensitive element, and removal from the probe. The electronic thermometer probe cover arrangements presently used are subject to one or more of these problems.

SUMMARY OF THE INVENTION

The present invention provides an improved electronic thermometer probe and cover assembly readily usable to provide reliable temperatures.

More particularly, a thermometer probe carrying a temperature sensitive element on its end is inserted into a sterile disposable probe cover. Cooperating elements on the cover and probe assembly snap together to hold the cover in place. In order to snap the cover onto the probe, the cover must urge the probe inwardly against a resilient force into a handle, thus insuring intimate contact between the end of the probe cover and probe to provide efficient heat transfer to the probe sensing element.

Following use of the probe to assertain a patient's temperature, actuation of a thumb button on the handle causes the cover to snap off and be ejected from the probe.

These and further features and advantages of the invention will be more readily understood when the following description is read in connection with the accompanying drawings.

BRIEF DESCRIPTION OF THE DRAWINGS

FIG. 1 is a view of the inventive electronic thermometer probe and cover assembly with the probe cover removed;

FIG. 2 is a view of the probe assembly of FIG. 1 with the cover in place on the probe;

FIG. 3 is an end view of the probe assembly of FIG. 2;

FIG. 4 is a cross-section of FIG. 2 taken along the view line 4—4 looking in the direction of the arrows;

FIG. 5 is a detailed view of the thermometer probe and cover assembly with the handle partially broken away to show interior details;

FIG. 6 is a view of the probe handle with a handle cover removed to illustrate other structural details;

FIG. 7 is a cross-section of FIG. 5 taken along the view line 7—7 looking in the direction of the arrows; and FIG. 8 is a cross-section of FIG. 5 taken along the view line 8—8 looking in the direction of the arrows.

DESCRIPTION OF EXEMPLARY EMBODIMENTS

Referring to the drawings with reference to FIGS. 1 through 4, an electronic thermometer probe assembly 10 includes a probe 11 and a handle 12 from which extends a thumb button 13 and a cable 14. A cylindrical shoulder 15, defined by a cylindrical groove 16, is located at the end of the handle 12 into which the probe 11 can slide a short distance against a resilient force, as explained below.

A disposable elongated cylindrical probe cover 17, formed of a suitable rigid plastic, includes a thin-walled closed end 18, an open end 19 and a plurality of interior circumferentially spaced protuberances 20 spaced a short distance from the open end. As shown in FIG. 2, the sterilized cover 17 fits over the probe 11.

After placing the cover 17 over the probe, it is urged toward the handle 12 which causes the protuberances 20 to snap over the shoulder 15 to hold the cover in position. The distance from an end 11a of the probe 11 to the shoulder 15 is greater than the distance from the closed cover end 18 to the protuberances 20. Thus to snap the protuberances over the shoulder 15, the closed end 18 must urge and slide the probe 11 into the handle 12 against a resilient force. As a result, the end 11a of the probe, which contains a thermister sensing element, is placed in contact, and remains in contact, with the then closed cover end 18 to facilitate efficient heat transfer to the thermister sensing element.

To remove the cover 17 from the probe 11 after taking a patient's temperature, the thumb button 13 is pressed into the handle 12 to force the probe 11 outwardly. This causes the protuberances 20 to snap over the shoulder 15, thereby ejecting the used cover off the probe.

Examining the probe assembly in greater detail, with reference to FIGS. 5 through 8, the handle 12 includes a handle body 21 and a handle cover 22 fitting and secured together to enclose a slide 23. A cylindrical portion 23a of the slide is urged against an interior conical section 21a of the body by a coil spring 24 mounted on four flanges 23b extending from a tapered cylindrical portion 23c of the slide body. The cylindrical portion 23c of the slide fits into a cylindrical chamber 30 formed by the body 21 and cover 22, and is urged against a tapered-down portion 31 of the body 21 and cover 22.

The probe 11, through which extends a cable 25 leading from the thermister sensing element at the probe end 11a, is slidably carried by a forwardly extending hollow cylindrical section 21b of the body 21. As shown in FIG. 8, the probe 11 passes through this section and is suitably secured, by adhesive for example, in an opening in the slide 23.

The cable 25, which leads from the thermister sensing element at the probe end, is coupled through a resistor 26 to the cable 14, the latter two elements being secured to ears 28 and 29 of the slide 23.

To prevent rotation and preserve proper alignment of the slide 23, a track 30 on the interior of the body 21 fits into a keyway 30a cut in the slide 23, as shown in FIG. 8.

The spring 24 extends into the hollow cylindrical thumb button 13 and over a cylindrical flange 13a extending longitudinally inwardly of the button. Two spaced keys 32 and two spaced keys 33 on the interior of the body 21 and the cover 22, respectively, cooperate with circumferential recesses 34 and 35 on opposite sides of the button 13 to limit its axial and rotary movement.

In using the electronic thermometer probe assembly 10, the probe 11 is inserted into the sterilized disposable probe cover 17. With the cover 17 retained against movement, the probe handle 12 is urged toward the cover to cause the probe 11 to retract into the handle against the bias of spring 24 to permit the protuberances 20 to snap into the groove 16. The thermometer probe is now ready for insertion into a body orifice with the thermister at the probe tip 11a urged into intimate contact with the thin end 18 of the cover.

Following use of the probe, actuation of the thumb button 13 increases spring pressure on the slide 23 and attached probe 11 which causes the cover 17 to unsnap from the handle and be ejected from the probe by expansion of the spring. If the spring pressure by itself is not sufficient to dislodge the cover 17, the lower end of the thumb botton 13 engages the slide cylindrical portion 23c, shown in phantom with the cover in place, to force the slide and probe forwardly, thereby unsnapping the cover 17 and causing its ejection by expansion of the spring.

While the invention has been shown and described with reference to the illustrated embodiment, it should be understood that various changes in form and details may be made without departing from the scope of the invention which is defined in the appended claims.

We claim:

1. A probe assembly for an electronic thermometer comprising a handle, a probe extending from the handle, means for providing limited axial movement of the probe within the handle, resilient means providing a force urging the probe axially out of the handle, an elongated cylindrical cover having open and closed ends adapted to cover the probe, a plurality of protuberances spaced circumferentially around the interior of the cover adjacent to its open end, a circumferential receiving means on the handle located on the same axis as the probe, the protuberances on the cover adapted to snap with the receiving means on the handle, the closed end of the cover axially moving the probe when the cover is placed thereover and urged toward the handle to compress the resilient means and snap the protuberances with the receiving means, thereby causing the probe end to remain in intimate contact with the closed end of the cover, and a thumb button in the handle movable axially toward and into engagement with the probe, the resilient means coupled to the probe and the thumb button, and extending therebetween so that depression of the thumb button increases the force urging the probe out of the handle until the protuberances are unsnapped from the receiving means, the resilient means thereupon expanding to move the probe forwardly and eject the cover from the probe.

2. A probe assembly as defined in claim 1, wherein the closed end of the cover is formed by a thin wall to provide for efficient heat transfer to the probe end.

* * * * *